(12) United States Patent
Magarill et al.

(10) Patent No.: US 8,485,667 B2
(45) Date of Patent: Jul. 16, 2013

(54) OPTICAL ELEMENT AND COLORED LIGHT COMBINER USING SAME

(75) Inventors: Simon Magarill, Cincinnati, OH (US); Charles L. Bruzzone, Woodbury, MN (US); Andrew J. Ouderkirk, Singapore (SG)

(73) Assignee: 3M Innovative Properties Company, Saint Paul, MN (US)

( * ) Notice: Subject to any disclaimer, the term of this patent is extended or adjusted under 35 U.S.C. 154(b) by 276 days.

(21) Appl. No.: 12/992,361

(22) PCT Filed: Dec. 22, 2008

(86) PCT No.: PCT/US2008/088020
§ 371 (c)(1), (2), (4) Date: Nov. 12, 2010

(87) PCT Pub. No.: WO2009/139799
PCT Pub. Date: Nov. 19, 2009

(65) Prior Publication Data
US 2012/0008096 A1 Jan. 12, 2012

Related U.S. Application Data

(60) Provisional application No. 61/095,146, filed on Sep. 8, 2008, provisional application No. 61/053,288, filed on May 15, 2008.

(51) Int. Cl.
*G03B 21/00* (2006.01)
*G03B 21/28* (2006.01)

(52) U.S. Cl.
USPC .................. 353/20; 353/30; 353/33; 353/81

(58) Field of Classification Search
USPC ......... 353/20, 30, 33, 94; 362/19; 359/487.04
See application file for complete search history.

(56) References Cited

U.S. PATENT DOCUMENTS 3,497,283 A    2/1970  Law
5,067,799 A    11/1991  Gold et al.
(Continued)

FOREIGN PATENT DOCUMENTS

JP    2004-020621    1/2004
JP    2005-3825    1/2005
(Continued)

*Primary Examiner* — Francis M Legasse, Jr.
*Assistant Examiner* — Bao-Luan Le (57) ABSTRACT

Optical elements, color combiners using the optical elements, and image projectors using the color combiners are described. The optical element includes light recycling stacks, a polarizing beam splitter, and a color-selective stacked retardation polarizing filter. The polarizing beam splitter includes a first reflective polarizer aligned to a first polarization direction. Each light recycling stack includes a second reflective polarizer aligned to the first polarization direction, and a retarder aligned at 45 degrees to the first polarization direction. The color combiner includes partially reflective light sources coupled to the optical element. Un-polarized light having different colors can enter the color combiner through the light recycling stacks, and combined light of a desired polarization state can exit the color combiner. Light having an undesired polarization state can be recycled to the desired polarization state within the color combiner, so that light utilization efficiency is increased. The image projector includes a color combiner coupled to an imaging source and projection elements, so that a first portion of the combined light is directed to the projection element, and a second portion of the combined light is recycled back into the color combiner.

14 Claims, 6 Drawing Sheets

U.S. PATENT DOCUMENTS

| | | | |
|---|---|---|---|
| 5,962,114 A | 10/1999 | Jonza et al. | |
| 6,490,087 B1 | 12/2002 | Fulkerson et al. | |
| 6,550,919 B1 | 4/2003 | Heine | |
| 6,583,833 B1 | 6/2003 | Kashima | |
| 6,636,276 B1 | 10/2003 | Rosenbluth | |
| 6,721,096 B2 | 4/2004 | Bruzzone et al. | |
| 6,857,747 B2 | 2/2005 | Pentico et al. | |
| 7,360,900 B2 * | 4/2008 | Sakata et al. | 353/20 |
| 2002/0154420 A1 | 10/2002 | Magarill et al. | |
| 2003/0184864 A1 | 10/2003 | Bruzzone et al. | |
| 2003/0227680 A1 | 12/2003 | Chen et al. | |
| 2004/0062024 A1* | 4/2004 | O'Connor et al. | 362/19 |
| 2004/0207919 A1 | 10/2004 | Chen et al. | |
| 2005/0122486 A1* | 6/2005 | Trollsch | 353/94 |
| 2005/0200812 A1* | 9/2005 | Sakata et al. | 353/20 |
| 2006/0007538 A1 | 1/2006 | Robinson | |
| 2006/0007539 A1 | 1/2006 | Mihalakis | |
| 2006/0028620 A1 | 2/2006 | Conner | |
| 2006/0028729 A1 | 2/2006 | Nishiwaki et al. | |
| 2006/0164857 A1 | 7/2006 | Morejon et al. | |
| 2006/0171035 A1 | 8/2006 | Berman et al. | |
| 2006/0238716 A1* | 10/2006 | Lee et al. | 353/20 |
| 2008/0018861 A1* | 1/2008 | Schuck et al. | 353/20 |
| 2008/0231953 A1* | 9/2008 | Young | 359/495 |
| 2008/0266526 A1 | 10/2008 | Kodama et al. | |
| 2008/0285129 A1 | 11/2008 | Magarill et al. | |

FOREIGN PATENT DOCUMENTS

| | | |
|---|---|---|
| JP | 2007-011179 | 1/2007 |
| WO | WO 94/25894 | 11/1994 |
| WO | WO 2004/114003 | 12/2004 |
| WO | WO 2006/124993 | 11/2006 |

* cited by examiner

OPTICAL ELEMENT AND COLORED LIGHT COMBINER USING SAME

Cross Reference to Related Applications

This application is a national stage filing under 35 U.S.C. 371 of PCT/US2008/088020, filed Dec. 22, 2008, which claims priority to U.S. Application No. 61/095,146, filed Sep. 8, 2008 and U.S. Application No. 61/053,288, filed May 15, 2008, the disclosure of which is incorporated by reference in their entirety herein.

BACKGROUND

Projection systems used for projecting an image on a screen can use multiple color light sources, such as light emitting diodes (LED's), with different colors to generate the illumination light. Several optical elements are disposed between the LED's and the image display unit to combine and transfer the light from the LED's to the image display unit. The image display unit can use various methods to impose an image on the light. For example, the image display unit may use polarization, as with transmissive or reflective liquid crystal displays.

Image brightness is an important parameter of a projection system. The brightness of color light sources, and the efficiencies of collecting, combining, homogenizing and delivering the light to the image display unit all affect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources. There is also a need for a light combining system that directs light of different wavelength spectrums in a manner to minimize the degradation of the wavelength-sensitive components in the light combiner.

SUMMARY

Generally, the present description relates to optical elements, color combiners using the optical elements, and image projectors using the color combiners. In one aspect, an optical element includes a polarizing beam splitter (PBS), having three input surfaces and an output surface. The PBS includes a first reflective polarizer, and the first reflective polarizer can be a free-standing film such as a pellicle. The first reflective polarizer can instead be disposed between two right-angle prisms that have polished faces to promote total internal reflection (TIR) within the PBS. A light recycling structure comprising a retarder and a second reflective polarizer is disposed facing each of the three input surfaces, and a polarization filter is disposed facing the output surface. Each of the first and second reflective polarizers can be a Cartesian reflective polarizer that is aligned to a first polarization direction, and each of the retarders can be aligned at a 45 degree angle to the first polarization direction. The polarization filter is capable of changing a polarization direction of at least one selected wavelength spectrum of light without changing a polarization direction of at least another selected wavelength spectrum of light. The optical element further includes a polarization rotating stack disposed between at least one light recycling structure and the corresponding input surface, so that light input to the surface through the polarization rotating stack has a desired polarization direction.

In one aspect, a color combiner includes the optical element and a first, second and (optionally) third input light source configured to emit light through the light recycling structures toward the PBS, and transmit a combined color light through the output surface. The input light sources can be unpolarized color light sources, and the combined color light can be a combined color light polarized in a desired direction. Each of the input light sources can be partially reflecting to permit recycling of light polarized in an undesired direction. In one aspect, a method of combining light includes directing unpolarized light of a first, second and (optionally) third color toward the color combiner, and receiving a combined polarized light from the polarization filter. In another aspect, an image projector includes the color combiner and an imager disposed to direct a first portion of the combined color light output to a projection element, and a second portion of the combined color light output back to the color combiner for recycling.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The optical elements described herein can be configured as color combiners that receive different wavelength spectrum lights and produce a combined light output that includes the different wavelength spectrum lights. In one aspect, the received light inputs are unpolarized, and the combined light output is polarized in a desired direction. In one embodiment, received lights with the undesired polarization direction are recycled and rotated to the desired polarization direction, improving the light utilization efficiency. In some embodiments, the combined light has the same etendue as each of the received lights. The combined light can be a polychromatic combined light that comprises more than one wavelength spectrum of light. The combined light can be a time sequenced output of each of the received lights. In one aspect, each of the different wavelength spectrums of light correspond to a different color light (e.g. red, green and blue), and the combined light output is white light, or a time sequenced red, green and blue light. For purposes of the description provided herein, "color light" and "wavelength spectrum light" are both intended to mean light having a wavelength spectrum range which may be correlated to a specific color if visible to the human eye. The more general term "wavelength spectrum light" refers to both visible and other wavelength spectrums of light including, for example, infrared light.

Also for the purposes of the description provided herein, the term "facing" refers to one element disposed so that a perpendicular line from the surface of the element follows an optical path that is also perpendicular to the other element. One element facing another element can include the elements disposed adjacent each other. One element facing another element further includes the elements separated by optics so that a light ray perpendicular to one element is also perpendicular to the other element.

According to one aspect, an optical element comprises a polarizing beam splitter (PBS) having three input surfaces, an output surface, and a first reflective polarizer. In one embodiment, the first reflective polarizer can be aligned to a first polarization direction. The first reflective polarizer is positioned so that light from each of three color lights input to the PBS intercept the first reflective polarizer at approximately a 45 degree angle. In one embodiment, the intercept angle ranges from 35 to 55 degrees; from 40 to 50 degrees; from 43 to 48 degrees; or from 44.5 to 45.5 degrees.

The first reflective polarizer can be any known reflective polarizer such as a MacNeille polarizer, a wire grid polarizer, or a multilayer optical film polarizer. According to one embodiment, a multilayer optical film polarizer can be a preferred first reflective polarizer. The first reflective polarizer can be disposed between the diagonal faces of two prisms, or it can be a free-standing film such as a pellicle. In some embodiments, the PBS light utilization efficiency is improved when the first reflective polarizer is disposed between two prisms. In this embodiment, some of the light traveling through the PBS which would otherwise be lost from the optical path can undergo Total Internal Reflection (TIR) from the prism faces and rejoin the optical path. For at least this reason, the following description is directed to PBSs where first reflective polarizers are disposed between the diagonal faces of two prisms; however, it is to be understood that the PBS can function in the same manner when used as a pellicle. In one aspect, all of the external faces of the PBS prisms are highly polished so that light entering the PBS undergoes TIR. In this manner, light is contained within the PBS and the light is partially homogenized while still preserving etendue.

Two or more unpolarized color lights can be directed to the input surfaces of the optical element, and each is split according to polarization by a light recycling film stack disposed adjacent to each of the input surfaces. A polarization filter is disposed adjacent the output surface of the PBS, and can selectively change the polarization direction of at least one of the input color lights as it exits the PBS. In one embodiment, each light recycling film stack comprises a retarder and a second reflective polarizer.

The retarder can provide any desired retardation, such as an eighth-wave retarder, a quarter-wave retarder, and the like. In embodiments described herein, there is an advantage to using a quarter-wave retarder and the associated second reflective polarizer. Linearly polarized light is changed to circularly polarized light as it passes through a quarter-wave retarder aligned at an angle of 45° to the axis of light polarization. Subsequent reflections from the reflective polarizers and quarter-wave retarders in the color combiner result in efficient combined light output from the light combiner. In contrast, linearly polarized light is changed to a polarization state partway between s-polarization and p-polarization (either elliptical or linear) as it passes through other retarders and orientations, and can result in a lower efficiency of the combiner.

The second reflective polarizer can be any known reflective polarizer such as a MacNeille polarizer, a wire grid polarizer, or a multilayer optical film polarizer. In one embodiment, each of the second reflective polarizers can be aligned to the first polarization direction. According to one embodiment described below, a color light combining system receives unpolarized light from different color unpolarized light sources, and produces a combined light output that is polarized in one desired direction. In one aspect, up to three received color lights are each split according to polarization (e.g. s-polarization and p-polarization) by the second reflective polarizer. The s-polarized light of each color passes through the second reflective polarizer toward the PBS. The p-polarized light of each color is reflected from the second reflective polarizer and recycled back to the light source before entering the PBS. The light source is at least partially reflective. The recycled p-polarized light passes through the retarder twice, both before and after reflecting from the light source, becoming s-polarized light which can then pass through the second reflective polarizer toward the PBS. According to one embodiment, the retarder is a quarter-wave retarder having a slow-axis aligned at 45 degrees to the first polarization direction.

In one aspect, the optical element further comprises a polarization rotating stack, which includes a color-selective dichroic filter sandwiched between two retarders. According to one embodiment, each of the retarders is a quarter wave retarder having a slow-axis aligned at 45 degrees to the first polarization direction. The polarization rotating stack is disposed between an input surface of the PBS and the corresponding light recycling film stack. The color-selective dichroic filter is chosen so that the color light passing through the filter changes polarization direction before entering the input surface of the PBS.

In one embodiment, the first color light comprises a red light, the second color light comprises a blue light and the third color light comprises a green light, and the color light combiner combines the red light, blue light and green light to produce white light, or time-sequenced red, blue and green light. In one embodiment, the s-polarized light of the second color (blue light) is changed to p-polarized blue light as it passes through the polarization rotating stack, prior to entering the PBS. In this embodiment, the color-selective dichroic filter is selected to transmit blue light and reflect at least red light. In this manner, only the p-polarized blue color light enters and passes through the PBS. The lifetime and stability of the first reflective polarizer within the polarizing beam splitter can be improved by limiting the exposure to a single pass of p-polarized blue light.

The light can be collimated, convergent, or divergent when it enters the PBS. Convergent or divergent light entering the PBS can be lost through one of the faces or ends of the PBS prisms. To avoid such losses, all of the exterior faces of the PBS can be polished to enable TIR within the PBS. Enabling TIR improves the utilization of light entering the PBS, so that substantially all of the light entering the PBS within a range of angles is redirected to exit the PBS through the desired face.

The components of a light combiner including prisms, reflective polarizers, quarter-wave retarders, mirrors and filters can be bonded together by a suitable optical adhesive. The optical adhesive used to bond the components together can have a lower index of refraction than the index of refraction of the prisms used in the light combiner. A light combiner that is fully bonded together offers advantages including alignment stability during assembly, handling and use.

According to one aspect, the reflective polarizers each comprise a multi-layer optical film. The PBS produces a first combined light output that includes p-polarized first and second color light, and s-polarized third color light. A first combined light output is passed through a polarization filter, such as a color-selective stacked retardation filter, that selectively changes the polarization of the third color light as the third color light passes through the polarization filter. The polarization filter produces a second combined light output that includes the first, second and third color lights combined to have the same polarization (e.g. p-polarization). The second combined output is useful for illumination of transmissive or reflective display mechanisms that modulate polarized light to produce an image.

The embodiments described above can be more readily understood by reference to the Figures and their accompanying description, which follows.

Figure 1:
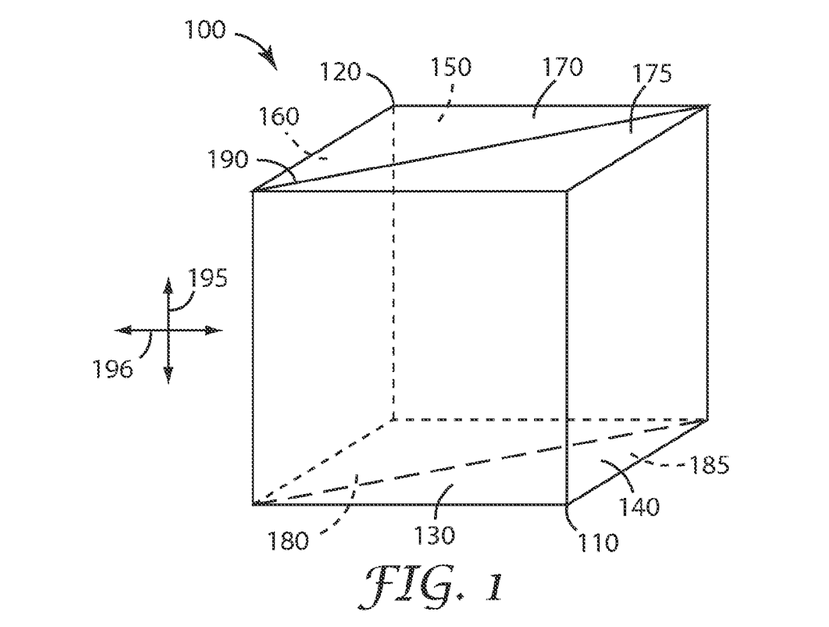
FIG. 1 is a perspective view of a polarizing beam splitter.

FIG. 1 is a perspective view of a PBS. PBS 100 includes a first reflective polarizer 190 disposed between the diagonal faces of prisms 110 and 120. Prism 110 includes two end faces 175, 185, and a first and second prism face 130, 140 having a 90° angle between them. Prism 120 includes two end faces 170, 180, and a third and fourth prism face 150, 160 having a 90° angle between them. The first prism face 130 is parallel to the third prism face 150, and the second prism face 140 is parallel to the fourth prism face 160. The identification of the four prism faces shown in FIG. 1 with a "first", "second", "third" and "fourth" serves to clarify the description of PBS 100 in the discussion that follows. First reflective polarizer 190 can be a Cartesian reflective polarizer or a non-Cartesian reflective polarizer. A non-Cartesian reflective polarizer can include multilayer inorganic films such as those produced by sequential deposition of inorganic dielectrics, such as a MacNeille polarizer. A Cartesian reflective polarizer has a polarization axis direction, and includes both wire-grid polarizers and polymeric multilayer optical films such as can be produced by extrusion and subsequent stretching of a multilayer polymeric laminate. In one embodiment, first reflective polarizer 190 is aligned so that one polarization axis is parallel to a first polarization direction 195, and perpendicular to a second polarization direction 196. In one embodiment, the first polarization direction 195 can be the s-polarization direction, and the second polarization direction 196 can be the p-polarization direction. As shown in FIG. 1, the first polarization direction 195 is perpendicular to each of the end faces 170, 175, 180, 185.

A Cartesian reflective polarizer film provides the polarizing beam splitter with an ability to pass input light rays that are not fully collimated, and that are divergent or skewed from a central light beam axis. The Cartesian reflective polarizer film can comprise a polymeric multilayer optical film that comprises multiple layers of dielectric or polymeric material. Use of dielectric films can have the advantage of low attenuation of light and high efficiency in passing light. The multilayer optical film can comprise polymeric multilayer optical films such as those described in U.S. Pat. No. 5,962,114 (Jonza et al.) or U.S. Pat. No. 6,721,096 (Bruzzone et al.).

Figure 2:
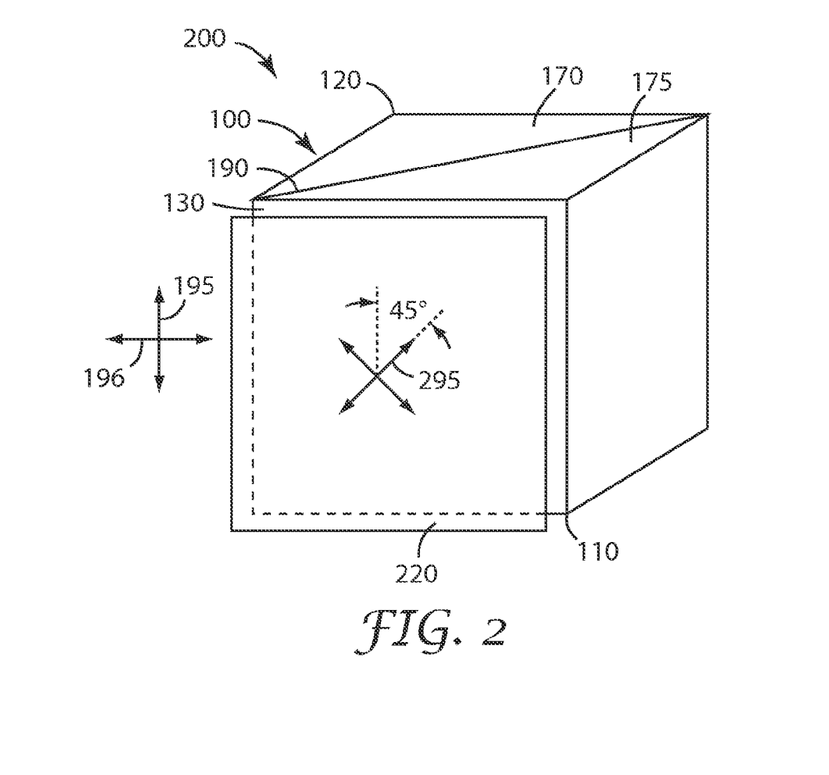
FIG. 2 is a perspective view of a polarizing beam splitter with a quarter-wave retarder.

FIG. 2 is a perspective view of the alignment of a quarter-wave retarder to a PBS, as used in some embodiments. Quarter-wave retarders can be used to change the polarization state of incident light. PBS retarder system 200 includes PBS 100 having first and second prisms 110 and 120. A quarter-wave retarder 220 is disposed adjacent the first prism face 130. First reflective polarizer 190 is a Cartesian reflective polarizer film aligned to first polarization direction 195. Quarter-wave retarder 220 includes a quarter-wave polarization direction 295 that can be aligned at 45° to first polarization direction 195. Although FIG. 2 shows polarization direction 295 aligned at 45° to first polarization direction 195 in a clockwise direction, polarization direction 295 can instead be aligned at 45° to first polarization direction 195 in a counterclockwise direction. In some embodiments, quarter-wave polarization direction 295 can be aligned at any degree orientation to first polarization direction 195, for example from 90° in a counter-clockwise direction to 90° in a clockwise direction. It can be advantageous to orient the retarder at approximately +/−45° as described, since circularly polarized light results when linearly polarized light passes through a quarter-wave retarder so aligned to the polarization direction. Other orientations of quarter-wave retarders can result in s-polarized light not being fully transformed to p-polarized light, and p-polarized light not being fully transformed to s-polarized light upon reflection from the mirrors, resulting in reduced efficiency of the light combiners described elsewhere in this description.

Figure 3A:
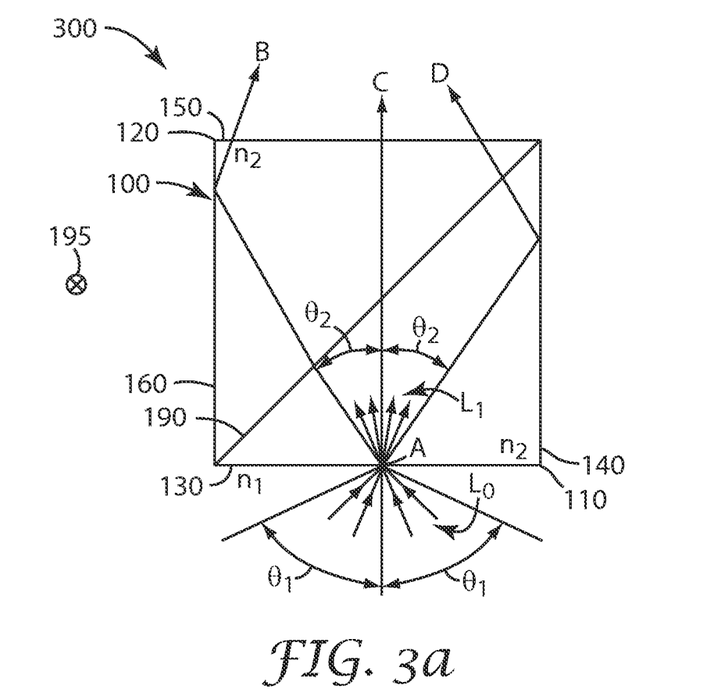
FIG. 3a is a top schematic view showing a polarizing beam splitter with polished faces.

FIG. 3a shows a top view of a path of light rays within a polished PBS 300. According to one embodiment, the first, second, third and fourth prism faces 130, 140, 150, 160 of prisms 110 and 120 are polished external surfaces that are in contact with a material having an index of refraction "$n_1$" that is less than the index of refraction "$n_2$" of prisms 110 and 120. According to another embodiment, all of the external faces of the PBS 300 (including end faces, not shown) are polished faces that provide TIR of oblique light rays within PBS 300. The polished external surfaces are in contact with a material having an index of refraction "$n_1$" that is less than the index of refraction "$n_2$" of prisms 110 and 120. TIR improves light utilization in PBS 300, particularly when the light directed into PBS is not collimated along a central axis, i.e. the incoming light is either convergent or divergent. At least some light is trapped in PBS 300 by total internal reflections until it leaves through third prism face 150. In some cases, substantially all of the light is trapped in PBS 300 by total internal reflections until it leaves through third prism face 150.

As shown in FIG. 3a, light rays $L_0$ enter first prism face 130 within a range of angles $\theta_1$. Light rays $L_1$ within PBS 300 propagate within a range of angles $\theta_2$ such that the TIR condition is satisfied at prism faces 140, 160 and the end faces (not shown). Light rays "AB", "AC" and "AD" represent three of the many paths of light through PBS 300, that intersect first reflective polarizer 190 at different angles of incidence before exiting through third prism face 150. Light rays "AB" and "AD" also both undergo TIR at prism faces 140 and 160, respectively, before exiting. It is to be understood that ranges of angles $\theta_1$ and $\theta_2$ can be a cone of angles so that reflections can also occur at the end faces of PBS 300. In one embodiment, first reflective polarizer 190 is selected to efficiently split light of different polarizations over a wide range of angles of incidence. A polymeric multilayer optical film is particularly well suited for splitting light over a wide range of angles of incidence. Other reflective polarizers including MacNeille polarizers and wire-grid polarizers can be used, but are less efficient at splitting the polarized light. A MacNeille polarizer does not efficiently transmit light at high angles of incidence. Efficient splitting of polarized light using a MacNeille polarizer can be limited to incidence angles below about 6 or 7 degrees from the normal, since significant reflection of both polarization states occur at larger angles. Efficient splitting of polarized light using a wire-grid polarizer typically requires an air gap adjacent one side of the wires, and efficiency drops when a wire-grid polarizer is immersed in a higher index medium.

Figure 3B:
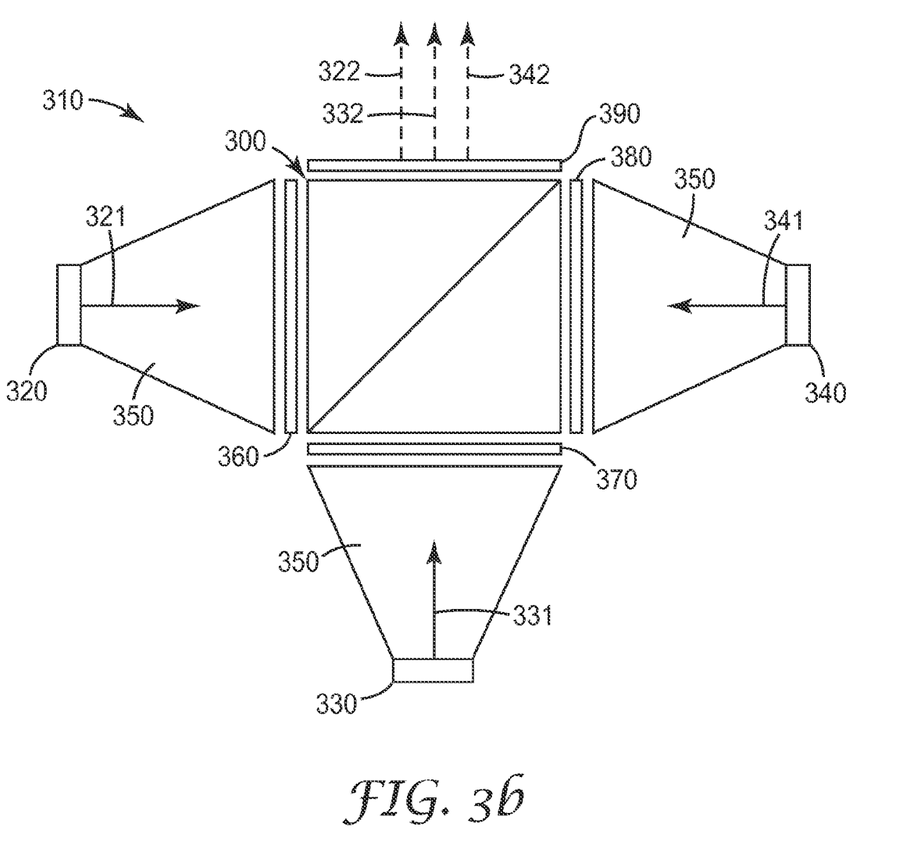
FIG. 3b is a top schematic view of a color combiner and collimating lightguides.

In one aspect, FIG. 3b shows an optical element 310 configured as a color combiner, comprising a light tunnel 350 disposed between each of a first, second and third light source (320, 330, 340) and a PBS 300. The light tunnels 350 can be useful to partially collimate light originating from the light source, and decrease the angle that the light enters the PBS. A first, second, and third light source 320, 330, 340 emits first, second, and third unpolarized color light 321, 331, 341 which travels through light tunnels 350, passes through a first, second, and third light recycling film stack 360, 370, 380 (respectively) into PBS 300, passes through color-selective stacked retardation polarizer 390, and exits optical element 310 as first, second, and third color light 322, 332, 342 polarized in a first direction. Light recycling film stacks 360, 370, 380 will be described more fully elsewhere, but generally comprise a reflective polarizer and retarder. The position of the retarder and reflective polarizer relative to the adjacent light source is dependent on the desired path of each of the polarization components, and are described elsewhere with reference to the Figures. Light tunnels 350 are an optional component for the color combiner 310, and are omitted from descriptions of the color combiner that follow.

Figure 4:
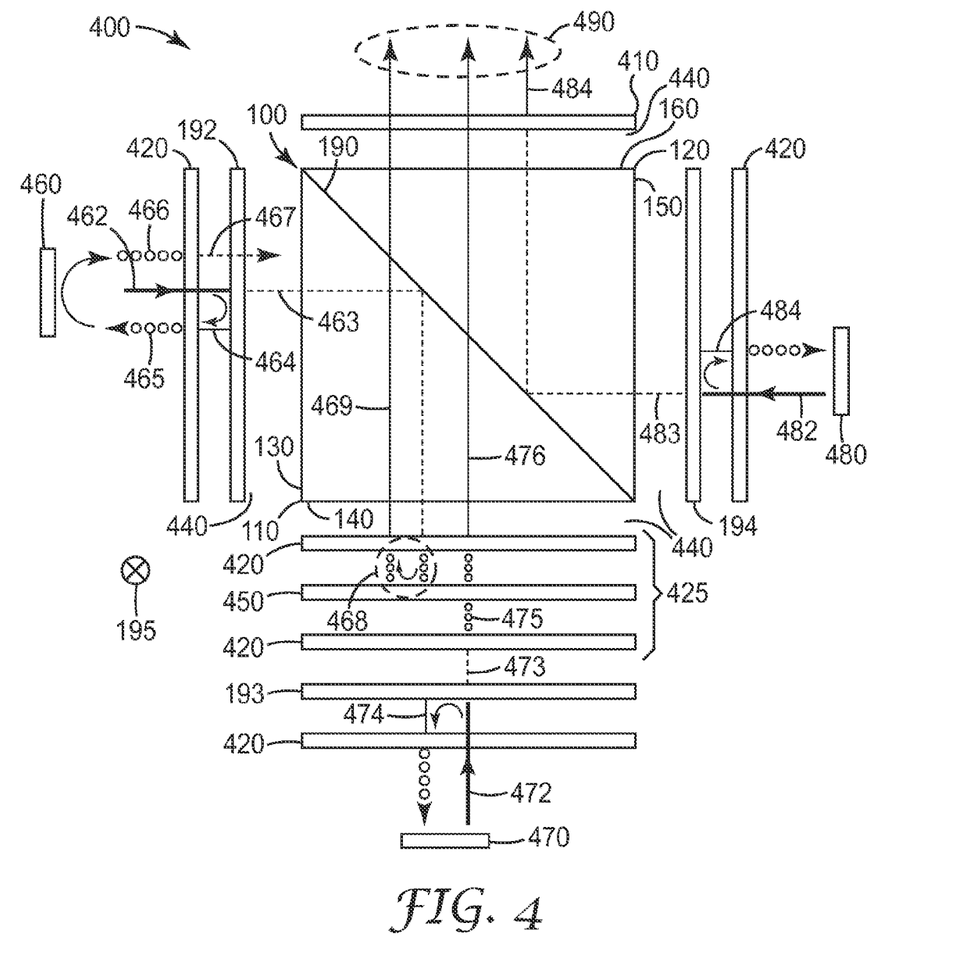
FIG. 4 is a top schematic view of a light combiner.

In one aspect, FIG. 4 is a top view schematic representation of an optical element 400 configured as a color combiner, which includes a PBS 100. The first reflective polarizer 190 is aligned to the first polarization direction 195 as described elsewhere. A second, third, and fourth reflective polarizer 192, 193, 194 is disposed facing the second, third and fourth prism faces 130, 140, 150, respectively. Each of the first, second, third and fourth reflective polarizers 190, 192, 193, 194 can be a Cartesian polarizer as described elsewhere, and can be aligned to the first polarization direction 195. In one aspect, the first reflective polarizer 190 can comprise a polymeric multilayer optical film. In one aspect, the first through fourth reflective polarizers 190, 192, 193, 194 can each comprise a polymeric multilayer optical film.

A retarder 420 is disposed facing each of the second, third, and fourth reflective polarizers 192, 193, 194, so that each reflective polarizer is between the corresponding retarder and the respective prism face. The combination of retarder 420 and second reflective polarizer (192, 193, 194) cooperate to transmit one polarization direction of light, and recycle the other polarization state of incident light, as described elsewhere.

A polarization rotating stack 425 can be disposed between the third prism face 140 and the third reflective polarizer 193. The polarization rotating stack 425 comprises retarders 420 disposed on either side of a wavelength-selective reflector such as a color-selective dichroic filter 450. The color-selective dichroic filter 450 is selected to transmit a selected wavelength spectrum of light, and reflect at least one other wavelength spectrum of light. The retarders 420 in the film stack change the polarization direction of transmitted light upon passing through the polarization rotating stack 425, as described elsewhere. In one embodiment, each retarder 420 in color combiner 400 is a quarter-wave retarder orientated at 45° to the first polarization direction 195.

Optical element 400 also includes a polarization filter 410 disposed facing the first prism face 160, the polarization filter 410 capable of changing the polarization direction of at least one selected wavelength spectrum of light without changing the polarization direction of at least another selected wavelength spectrum of light. In one aspect, the polarization filter 410 is a color-selective stacked retardation polarizer, such as a ColorSelect® filter (available from ColorLink® Inc., Boulder, Colo.). Color combiner 400 can be used with a variety of light sources as described elsewhere, and FIG. 4 shows first light source 460, second light source 470, and third light source 480 capable of emitting light toward color combiner 400.

Each of the light sources (460, 470, 480) has a surface that is at least partially light reflective. Each light source is mounted on a substrate that can also be at least partially reflective. The partially reflective light source, and optionally the partially reflective substrate cooperate with the color combiner to recycle light and improve efficiency. According to yet another aspect, light pipes can be provided to provide spacing that separate light sources from the polarizing beam splitter. An integrator can also be provided to increase uniformity of combined light outputs. According to one aspect, each light source (460, 470, 480) comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors.

The path of the first colored light will now be described with reference to FIG. 4. First light source 460 injects unpolarized first color light 462 through retarder 420 and intercepts second reflective polarizer 192. Second reflective polarizer 192 splits the light into transmitted first color s-polarized light 463 and reflected first color p-polarized light 464. First color p-polarized light 464 is recycled by passing through retarder 420, becoming circularly polarized first color light 465, reflecting from first light source 460, changing the direction of circular polarization to circularly polarized first color light 466, and passes again through retarder 420 to become recycled first color s-polarized light 467. Recycled first color s-polarized light 467 follows the same path through the color combiner as transmitted first color s-polarized light 463 described below.

First color s-polarized light 463 enters PBS 100 through second prism face 130, reflects from first reflective polarizer 190, exits PBS 100 through third prism face 140, and changes to first color circularly polarized light 468 as it passes through retarder 420 of polarization rotating stack 425. First color circularly polarized light 468 reflects from color-selective dichroic filter 450, changing the direction of circular polarization, passes again through retarder 420 of polarization rotating stack 425, and re-enters PBS 100 through third prism face 140 as first color p-polarized light 469. First color p-polarized light 469 passes unchanged through first reflective polarizer 190, exits PBS 100 through first prism face 160, and passes unchanged through polarization filter 410 as first color p-polarized light 469.

The path of the second colored light will now be described with reference to FIG. 4. Second light source 470 injects unpolarized second color light 472 through retarder 420 and intercepts third reflective polarizer 193. Third reflective polarizer 193 splits the light into transmitted second color s-polarized light 473 and reflected second color p-polarized light 474. Second color p-polarized light 474 is recycled by passing through retarder 420, in the same manner as previously described for first color p-polarized light 464, and follows the same path through the color combiner as transmitted second color s-polarized light 473 described below.

Second color s-polarized light 473 enters polarization rotating stack 425 through retarder 420, changing to second color circularly polarized light 475, passes unchanged through color-selective dichroic filter 450, and changes to second color p-polarized light 476 as it exits polarization rotating stack 425 through retarder 420. Second color p-polarized light 476 enters PBS 100 through third prism face 140, passes unchanged through first reflective polarizer 190, exits PBS 100 through first prism face 160, and passes unchanged through polarization filter 410 as second color p-polarized light 476.

The path of the third colored light will now be described with reference to FIG. 4. Third light source 480 injects unpolarized third color light 482 through retarder 420 and intercepts fourth reflective polarizer 194. Fourth reflective polarizer 194 splits the light into transmitted third color s-polarized light 483 and reflected third color p-polarized light 484. Third color p-polarized light 484 is recycled by passing through retarder 420, in the same manner as previously described for first color p-polarized light 464, and follows the same path through the color combiner as transmitted third color s-polarized light 483 described below.

Third color s-polarized light 483 enters PBS 100 through fourth prism face 150, reflects from first reflective polarizer 190, exits PBS 100 through first prism face 160, and changes polarization direction as it passes through polarization filter 410 to become third color p-polarized light 484.

In one embodiment, first color light 460 is red light, second color light 470 is blue light, and third color light 480 is green light. In this embodiment, color-selective dichroic filter 450 is a red light reflecting and blue light transmitting dichroic filter, and polarization filter 410 is a G/RB ColorSelect® filter that changes the polarization direction of green light while allowing both red and blue light to be transmitted without change in polarization.

Figure 6:
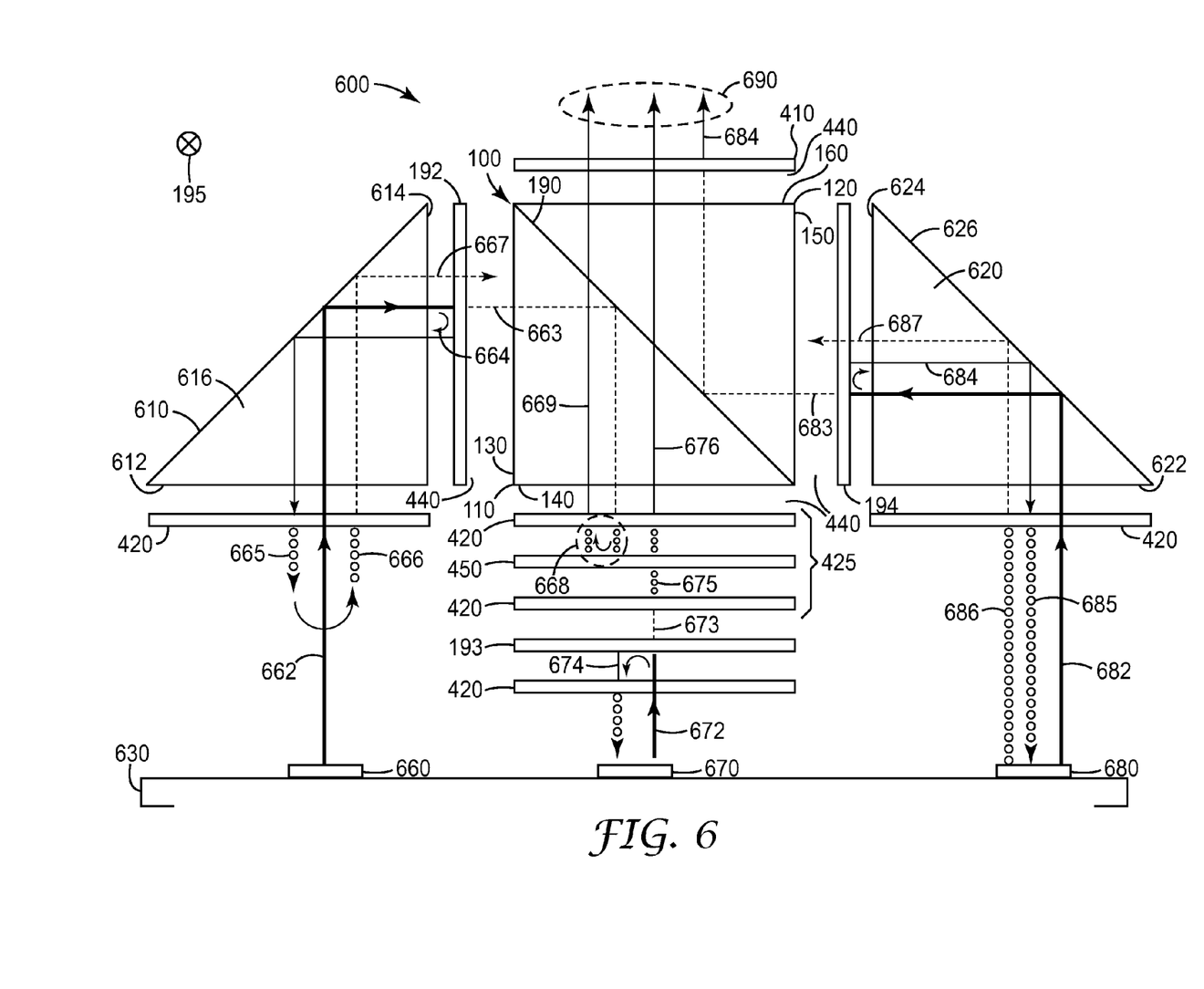
FIG. 6 is a top schematic view of a light combiner.

FIG. 6 is a top view schematic of a color combiner according to one aspect of the disclosure. In FIG. 6, paths of a first through third light rays 662, 672, 682 are described through an unfolded color combiner 600 that includes a PBS 100. Unfolded color combiner 600 can be one embodiment of color combiner 400 described with reference to FIG. 4, and can be used with a variety of light sources as described elsewhere. The paths of light rays of each polarization emitted from a first, second, and third partially reflective light source 660, 670, 680 located on the plane 630, are shown in FIG. 6, to more clearly illustrate the function of the various components of unfolded color combiner 600. In one embodiment, plane 630 can include a heat exchanger common to the three light sources.

Unfolded color combiner 600 includes a third prism 610 and a fourth prism 620 disposed facing first prism face 130 and third prism face 150, respectively, of PBS 100 (described elsewhere). Third prism 610 and fourth prism 620 are each a "turning prism". First and third light 662, 682 emanating from first and third light sources 660, 680 located on plane 630 are turned by third and fourth prisms 610, 620 to enter PBS 100 in a direction perpendicular to first and third prism faces 130, 150, respectively.

Third prism 610 includes fifth and sixth prism faces, 612, 614, and diagonal prism face 616 between them. Fifth and sixth prism faces 612, 614 are "turning prism faces". Fifth prism face 612 is positioned to receive first light 662 from first light source 660 and direct light to first prism face 130. Fourth prism 620 includes seventh and eighth prism faces 622, 624, and diagonal prism face 626 between them. Seventh and eighth prism faces 622, 624 also are "turning prism faces". Seventh prism face 622 is positioned to receive third light 682 from third light source 680 and direct light to third prism face 150.

Fifth, sixth seventh and eighth prism faces 612, 614, 622, 624, and diagonal prism faces 616, 626 can be polished for preservation of TIR, as described elsewhere. Diagonal prism faces 616, 626 of third and fourth prisms 610, 620 can also include a metal coating, a dielectric coating, an organic or inorganic interference stack, or a combination to enhance reflection.

The first reflective polarizer 190 is aligned to the first polarization direction 195 as described elsewhere. A second, third, and fourth reflective polarizer 192, 193, 194 is disposed facing the second, third and fourth prism faces 130, 140, 150, respectively. Each of the first, second, third and fourth reflective polarizers 190, 192, 193, 194 can be a Cartesian polarizer as described elsewhere, and can be aligned to the first polarization direction 195. In one aspect, the first reflective polarizer 190 can comprise a polymeric multilayer optical film. In one aspect, the first through fourth reflective polarizers 190, 192, 193, 194 can each comprise a polymeric multilayer optical film.

A retarder 420 is disposed facing each of the second, third, and fourth reflective polarizers 192, 193, 194, so that each reflective polarizer is between the corresponding retarder and the respective prism face. As shown in FIG. 6, third reflective polarizer 193 is disposed facing and adjacent to retarder 420, while second and fourth reflective polarizers 192, 194 are separated (i.e. facing, but not adjacent) from retarder 420 by third and fourth prisms 610, 620, respectively, as described elsewhere. The combination of retarder 420 and second reflective polarizer (192, 193, 194) cooperate to transmit one polarization direction of light, and recycle the other polarization state of incident light, as described elsewhere.

In one embodiment shown in FIG. 6, second reflective polarizer 192 and the associated retarder 420 are disposed facing sixth and fifth prism faces 614, 612, respectively, and are also facing first prism face 130 of PBS 100. In one embodiment, fourth reflective polarizer 194 and the associated retarder 420 are disposed facing eighth and seventh prism faces 624, 622, respectively, and are also facing third prism face 150 of PBS 100. In another embodiment (not shown), second reflective polarizer 192 and associated retarder 420 are positioned facing one another in a manner similar to the positioning of third reflective polarizer 193 and the associated retarder 420 (e.g. adjacent each other). In this case second reflective polarizer 192 and associated retarder 420 can either be placed adjacent to fifth prism face 612, or adjacent to first prism face 130. In principle, unfolded light combiner 600 can function regardless of the separation between reflective polarizers and associated retarders, provided the orientation of each relative to the path of the light rays is unchanged, i.e. each is substantially perpendicular to the path of the light ray. However, depending on the nature of the reflection from diagonal prism faces 616 and 626, there may be more or less polarization mixing introduced by the reflection from those faces. This polarization mixing may result in lost light efficiency, and can be minimized by placing the second and fourth reflective polarizers 192, 194 closer to prism faces 130 and 150.

Each of the second, third and fourth reflective polarizers 192, 193, 194 can be separate from the associated quarter-wave retarder 420 as shown in FIG. 6. Further, each of the second, third and fourth reflective polarizers 192, 193, 194 can be in direct contact with the adjacent quarter-wave retarder 420. Alternatively, each of the second, third and fourth reflective polarizers 192, 193, 194 can be adhered to the adjacent quarter-wave retarder 420 with an optical adhesive. The optical adhesive can be a curable adhesive. The optical adhesive can also be a pressure-sensitive adhesive.

In one embodiment, each of the first, second and third light 662, 672, 682 can be unpolarized light and the combined light is polarized. In a further embodiment, each of the first, second and third lights 662, 672, 682 can be red, green and blue unpolarized light, and the combined light can be polarized white light. Each of the first, second, and third lights 662, 672, 682 can comprise light as described elsewhere with reference to FIG. 4.

In one aspect, unfolded light combiner 600 can include optional light tunnels 350 as described in FIG. 3b. The light tunnels 350 can be useful to partially collimate light originating from the light source, and decrease the angle that the light enters PBS 100. Light tunnels 350 are an optional component for the unfolded color combiner 600, and can also be optional components for any of the color combiners and splitters described herein. The light tunnels could have straight or curved sides, or they could be replaced by a lens system. Different approaches may be preferred depending on specific details of each application, and those with skill in the art will face no difficulty in selecting the optimal approach for a specific application.

A polarization rotating stack 425 can be disposed between the third prism face 140 and the third reflective polarizer 193. The polarization rotating stack 425 comprises retarders 420 disposed on either side of a wavelength-selective reflector such as a color-selective dichroic filter 450. The color-selective dichroic filter 450 is selected to transmit a selected wavelength spectrum of light, and reflect at least one other wavelength spectrum of light. The retarders 420 in the film stack change the polarization direction of transmitted light upon passing through the polarization rotating stack 425, as described elsewhere. In one embodiment, each retarder 420 in color combiner 400 is a quarter-wave retarder orientated at 45° to the first polarization direction 195.

Unfolded color combiner 600 also includes a polarization filter 410 disposed facing the first prism face 160, the polarization filter 410 capable of changing the polarization direction of at least one selected wavelength spectrum of light without changing the polarization direction of at least another selected wavelength spectrum of light. In one aspect, the polarization filter 410 is a color-selective stacked retardation polarizer, such as a ColorSelect® filter (available from ColorLink® Inc., Boulder, Colo.). Unfolded color combiner 600 can be used with a variety of light sources as described elsewhere, and FIG. 6 shows first light source 660, second light source 670, and third light source 680 capable of emitting light toward unfolded color combiner 600.

Each of the light sources (660, 670, 680) has a surface that is at least partially light reflective. Each light source is mounted on a plane 630 that can also be at least partially reflective. The partially reflective light source, and optionally the reflective plane cooperate with the color combiner to recycle light and improve efficiency. According to yet another aspect, light pipes can be provided to provide spacing that separate light sources from the polarizing beam splitter. An integrator can also be provided to increase uniformity of combined light outputs. According to one aspect, each light source (660, 670, 680) comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors.

The path of the first colored light will now be described with reference to FIG. 6. First light source 660 injects unpolarized first color light 662 through retarder 420, enters third prism 610 through fifth prism face 612, reflects from prism diagonal 616, exits third prism 610 through sixth prism face 614 and intercepts second reflective polarizer 192. Second reflective polarizer 192 splits the light into transmitted first color s-polarized light 663 and reflected first color p-polarized light 664. First color p-polarized light 664 is recycled by entering third prism 610 through sixth prism face 614, reflecting from prism diagonal 616, exiting third prism 610 through fifth prism face 612, passing through retarder 420, becoming circularly polarized first color light 665, reflecting from first light source 660, changing the direction of circular polarization to circularly polarized first color light 666, and passing again through retarder 420 to become recycled first color s-polarized light 667. Recycled first color s-polarized light 667 enters third prism 610 through fifth prism face 612, reflects from prism diagonal 616, exits third prism 610 through sixth prism face 614 and passes through second reflective polarizer 192 as first color s-polarized light 667. First color s-polarized light 667 follows the same path through the color combiner as transmitted first color s-polarized light 663, described below.

First color s-polarized light 663 enters PBS 100 through second prism face 130, reflects from first reflective polarizer 190, exits PBS 100 through third prism face 140, and changes to first color circularly polarized light 668 as it passes through retarder 420 of polarization rotating stack 425. First color circularly polarized light 668 reflects from color-selective dichroic filter 450, changing the direction of circular polarization, passes again through retarder 420 of polarization rotating stack 425, and re-enters PBS 100 through third prism face 140 as first color p-polarized light 669. First color p-polarized light 669 passes unchanged through first reflective polarizer 190, exits PBS 100 through first prism face 160, and passes unchanged through polarization filter 410 as first color p-polarized light 690.

The path of the second colored light will now be described with reference to FIG. 6. Second light source 670 injects unpolarized second color light 672 through retarder 420 and intercepts third reflective polarizer 193. Third reflective polarizer 193 splits the light into transmitted second color s-polarized light 673 and reflected second color p-polarized light 674. Second color p-polarized light 674 is recycled by passing through retarder 420, in the same manner as previously described for first color p-polarized light 464 of FIG. 4, and follows the same path through the color combiner as transmitted second color s-polarized light 673 described below.

Second color s-polarized light 673 enters polarization rotating stack 425 through retarder 420, changing to second color circularly polarized light 675, passes unchanged through color-selective dichroic filter 450, and changes to second color p-polarized light 676 as it exits polarization rotating stack 425 through retarder 420. Second color p-polarized light 676 enters PBS 100 through third prism face 140, passes unchanged through first reflective polarizer 190, exits PBS 100 through first prism face 160, and passes unchanged through polarization filter 410 as second color p-polarized light 690.

The path of the third colored light will now be described with reference to FIG. 6. Third light source 680 injects unpolarized third color light 682 through retarder 420, enters fourth prism 620 through seventh prism face 622, reflects from prism diagonal 626, exits fourth prism 620 through eighth prism face 624, and intercepts fourth reflective polarizer 194. Fourth reflective polarizer 194 splits the light into transmitted third color s-polarized light 683 and reflected third color p-polarized light 684. Third color p-polarized light 684 is recycled by passing through retarder 420, in the same manner as previously described for first color p-polarized light 664, and follows the same path through the color combiner as transmitted third color s-polarized light 683 described below.

Third color s-polarized light 683 enters PBS 100 through fourth prism face 150, reflects from first reflective polarizer 190, exits PBS 100 through first prism face 160, and changes polarization direction as it passes through polarization filter 410 to become third color p-polarized light 684.

In one embodiment, first color light 660 is red light, second color light 670 is blue light, and third color light 680 is green light. In this embodiment, color-selective dichroic filter 450 is a red light reflecting and blue light transmitting dichroic filter, and polarization filter 410 is a G/RB ColorSelect® filter that changes the polarization direction of green light while allowing both red and blue light to be transmitted without change in polarization.

Light sources in a three color light combining system can be energized sequentially. According to one aspect, the time sequence is synchronized with a transmissive or reflective imaging device in a projection system that receives a combined light output from the three color light combining system. According to one aspect, the time sequence is repeated at rate that is fast enough so that an appearance of flickering of projected image is avoided, and appearances of motion artifacts such as color break up in a projected video image are avoided.

Figure 5:
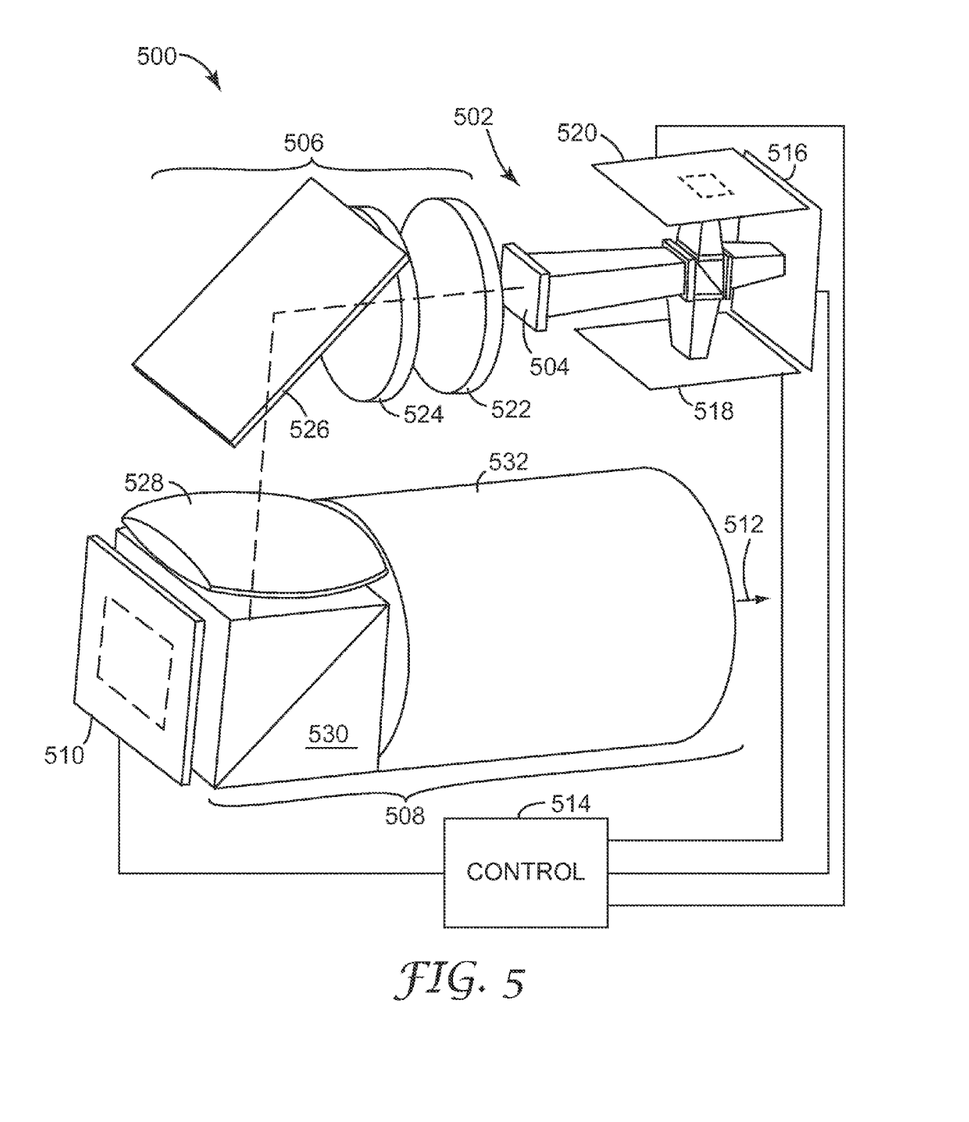
FIG. 5 is a schematic view of a projector.

FIG. 5 illustrates a projector 500 that includes a three color light combining system 502. The three color light combining system 502 provides a combined light output at output region 504. In one embodiment, combined light output at output region 504 is polarized. The combined light output at output region 504 passes through light engine optics 506 to projector optics 508.

The light engine optics 506 comprises lenses 522, 524 and a reflector 526. The projector optics 508 comprises a lens 528, a beam splitter 530 and projection lenses 532. One or more of the projection lenses 532 can be movable relative to the beam splitter 530 to provide focus adjustment for a projected image 512. A reflective imaging device 510 modulates the polarization state of the light in the projector optics, so that the intensity of the light passing through the PBS and into the projection lens will be modulated to produce the projected image 512. A control circuit 514 is coupled to the reflective imaging device 510 and to light sources 516, 518 and 520 to synchronize the operation of the reflective imaging device 510 with sequencing of the light sources 516, 518 and 520. In one aspect, a first portion of the combined light at output region 504 is directed through the projector optics 508, and a second portion of the combined light output is recycled back into color combiner 502 through output region 504. The second portion of the combined light can be recycled back into color combiner by reflection from, for example: a mirror, a reflective polarizer, a reflective LCD and the like. The arrangement illustrated in FIG. 5 is exemplary, and the light combining systems disclosed can be used with other projection systems as well. According to one alternative aspect, a transmissive imaging device can be used.

According to one aspect, the color light combining system produces a three color (white) output. According to another aspect, the color light combining system produces a time-sequenced three color output. The system has high efficiency because polarization properties (reflection for s-polarized light and transmission for p-polarized light) of a polarizing beam splitter with reflective polarizer film have low sensitivity for a wide range of angles of incidence of source light. Additional collimation components can be used to improve collimation of the light from light sources in the color combiner. Without a certain degree of collimation, there will be significant light losses associated with variation of dichroic reflectivity as a function of angle of incidence (AOI), loss of TIR or increased evanescent coupling to frustrate the TIR, and/or degraded polarization discrimination and function in the PBS. In the present disclosure, polarizing beam splitters function as light pipes to keep light contained by total internal reflection, and released only through desired surfaces.

Although the present invention has been described with reference to preferred embodiments, workers skilled in the art will recognize that changes may be made in form and detail without departing from the spirit and scope of the invention.

What is claimed is:

1. An optical element, comprising:
a polarizing beam splitter, comprising:
first and second prisms;
first, second, third, and fourth prism faces;
a first reflective polarizer disposed between the first and second prisms;
a polarization filter disposed facing the first prism face, capable of changing a polarization direction of at least one selected wavelength spectrum of light without changing a polarization direction of at least another selected wavelength spectrum of light;
a second, third and fourth reflective polarizer disposed facing the second, third, and fourth prism faces, respectively;
a first, second and third retarder disposed facing each of the second, third and fourth prism faces, opposite the reflective polarizers; and
a polarization rotating stack disposed between the third reflective polarizer and the third prism face, the polarization rotating stack comprising:
a fourth and fifth retarder;
a color-selective dichroic filter that transmits a first wavelength spectrum of light and blocks other wavelengths of light, disposed between the fourth and fifth retarders.

2. The optical element of claim 1, wherein each of the first through fifth retarder is a quarter-wave retarder aligned at 45 degrees to a first polarization direction.

3. The optical element of claim 1, wherein the polarization filter comprises a color-selective stacked retardation polarizing filter.

4. A color combiner, comprising:
the optical element of claim 1;
a first light source configured to emit light toward the first retarder;
a second light source configured to emit light toward the second retarder; and
an output region disposed to transmit a combined color light output.

5. The optical element of claim 1, further comprising at least one turning prism having a diagonal face and a turning prism face, wherein the turning prism face is disposed facing one of the first, second or third retarders.

6. The optical element of claim 2, wherein each of the first through fourth reflective polarizers is aligned to the first polarization direction.

7. The color combiner of claim 4, wherein the first and second light source comprises a first and a second color LED, respectively.

8. The color combiner of claim 4, further comprising a third light source configured to emit light toward the third retarder.

9. A method of combining light, comprising:
providing the light combiner of claim 4;
directing unpolarized light of the first and second color through the first and second retarders, respectively; and
receiving a combined polarized light from the polarization filter.

10. The optical element of claim 6, wherein each of the first through fourth reflective polarizers is a Cartesian reflective polarizer.

11. A method of combining light, comprising:
providing the light combiner of claim 8;

directing unpolarized light of the first, second and third color through the first, second and third retarders, respectively; and receiving a combined polarized light from the polarization filter.

12. An image projector, comprising:

the color combiner of claim 4 or claim 8;

an imager disposed to direct a first portion of the combined color light output to a projection element.

13. The optical element of claim 10, wherein the Cartesian reflective polarizer is a polymeric multilayer optical film.

14. An optical element, comprising:

a polarizing beam splitter that includes three input faces and an output face, each input face capable of receiving light;

a light recycling film stack disposed facing each of the input faces;

a polarization rotating stack disposed between at least one of the input faces and the respective light recycling film stack; and a color-selective stacked retardation polarizing filter disposed facing the output face, wherein an unpolarized first, second and third color light input to the first, second and third input faces passes through the color-selective stacked retardation polarizing filter as a combined light having a first polarization direction, wherein the polarization rotating stack comprises:

a first quarter-wave retarder;

a second quarter-wave retarder; and a color-selective dichroic filter disposed between the first and second quarter-wave retarders, wherein the first and second quarter-wave retarders are both aligned at 45 degrees to the first polarization direction.

* * * * *